United States Patent
Shepherd et al.

(10) Patent No.: US 6,804,540 B1
(45) Date of Patent: Oct. 12, 2004

(54) REMOTE BAND-PASS FILTER IN A DISTRIBUTED ANTENNA SYSTEM

(75) Inventors: Johnny D. Shepherd, Hillsborough, NC (US); Ossi I. Grohn, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 477 days.

(21) Appl. No.: 09/630,789

(22) Filed: Aug. 2, 2000

(51) Int. Cl.[7] ............................................... H04M 1/00
(52) U.S. Cl. .................... 455/562.1; 455/561; 455/306; 455/120; 455/121
(58) Field of Search .......................... 455/561, 92, 103, 455/562, 422, 560, 550, 307, 266, 562.1, 306, 120, 121, 123, 124, 125

(56) References Cited

U.S. PATENT DOCUMENTS 4,211,894 A * 7/1980 Watanabe et al.
5,781,865 A * 7/1998 Gammon
6,081,515 A * 6/2000 Toivola

FOREIGN PATENT DOCUMENTS

EP 0813310 A1 12/1997
WO WO 00/39943 7/2000

* cited by examiner

*Primary Examiner*—Erika Gary
*Assistant Examiner*—Huy Nguyen
(74) *Attorney, Agent, or Firm*—Coats & Bennett, P.L.L.C.

(57) ABSTRACT

A distributed antenna system in a communication system includes a programmable band pass filter at each antenna within the distributed system. Control information from a processor associated with the base station may instruct the band pass filter as to on which channels a particular antenna should transmit. In this manner, channel reuse may be promoted and channels can be dynamically reassigned during periods of peak usage.

28 Claims, 8 Drawing Sheets

REMOTE BAND-PASS FILTER IN A DISTRIBUTED ANTENNA SYSTEM

BACKGROUND OF THE INVENTION

The present invention relates to distributed antenna systems such as may be common in mobile communication networks.

Mobile terminals have become ubiquitous in modern society. Cellular phones, personal digital assistants, pagers, and the like, all occupy important niches within our daily existence. Mobile terminals allow individuals to access communication networks without the need for a land-based line. Thus, the individual may communicate while traveling across the country, or even just down the hall, away from a normal phone.

With the explosion of the popularity of mobile terminals, many companies have set up internal local area phone networks that may interface with the Public Land Mobile Network (PLMN) or may, in fact, be part of the PLMN. These internal phone networks may be proprietary or public and are designed to take advantage of the mobile terminals in the possession of employees or individuals at the location. In some instances, individuals present in areas covered by these internal networks intend to use their mobile terminals in place of a normal desk phone. This may eliminate wiring concerns in the building as well as promote easy growth. Other reasons may also exist for these internal networks.

These internal local area phone networks are characterized frequently by the use of distributed antenna systems that improve coverage throughout a building or other location. These distributed antenna systems, at least in the mobile terminal context, are characterized by one or more base stations each having a plurality of antennas connected thereto, usually by a coaxial line. Normally, a single antenna would experience local nulls and other interference that would preclude a single cell from adequately serving a building. The use of a distributed antenna system is designed to reduce structural interference to a minimum and offset other factors, which may contribute to poor coverage. Distributed antenna systems may, of course, be used for other reasons.

One shortcoming for these existing distributed antenna systems is that every antenna receives and transmits on every channel in use by the system. Thus, there may not be any reuse of channels in a distributed antenna system, even for those systems with multiple base stations, where channel reuse may be more feasible. Because every antenna uses every channel, there is no provision to allow an antenna to transmit a subset of the total available channels. Without allowing selected transmission, there is no ability for dynamic channel allocation.

In short, there is no ability in the present systems to create virtual cells associated with each antenna in a distributed antenna system. Such virtual cells would allow channel reuse, enabling more users to be active at the same. Further, such virtual cells may benefit from dynamic channel allocation wherein an antenna experiencing a heavy usage cycle could use additional channels, while antennas experiencing lulls may relinquish channels. Thus, there remains a need for the ability to tune selected antennas within a distributed antenna system to selected channels.

SUMMARY OF THE INVENTION

The problems associated with the prior art may be solved by using one or more tunable filters with the transmitter portion of each antenna in a distributed antenna system. The tunable filters may have multiple pass bands allowing a plurality of channels to be transmitted. In this manner, the transmit channels of each antenna within the distributed system may be controlled remotely and dynamically reassigned as needed or desired. Control information may originate at a base station and be directed down a coaxial line to the filters with instructions about to which channels a particular antenna should tune. As usage varies amongst the antennas, more channels may be dynamically reassigned to antennas experiencing heavy loads.

DETAILED DESCRIPTION OF THE PREFERRED EMBODIMENTS

The present invention is directed to an improvement on base stations having a distributed antenna system, however, an understanding of a communications system may be helpful for a proper understanding of the context of the present invention. While the following discussion is couched in terms of a TIA/EIA-136 communication system, it should be appreciated that the present invention is equally applicable to Global System for Mobile Communication (GSM), Pacific Digital Cellular (PDC), and the like, the standards and documentation of which are herein incorporated by reference.

Figure 1:
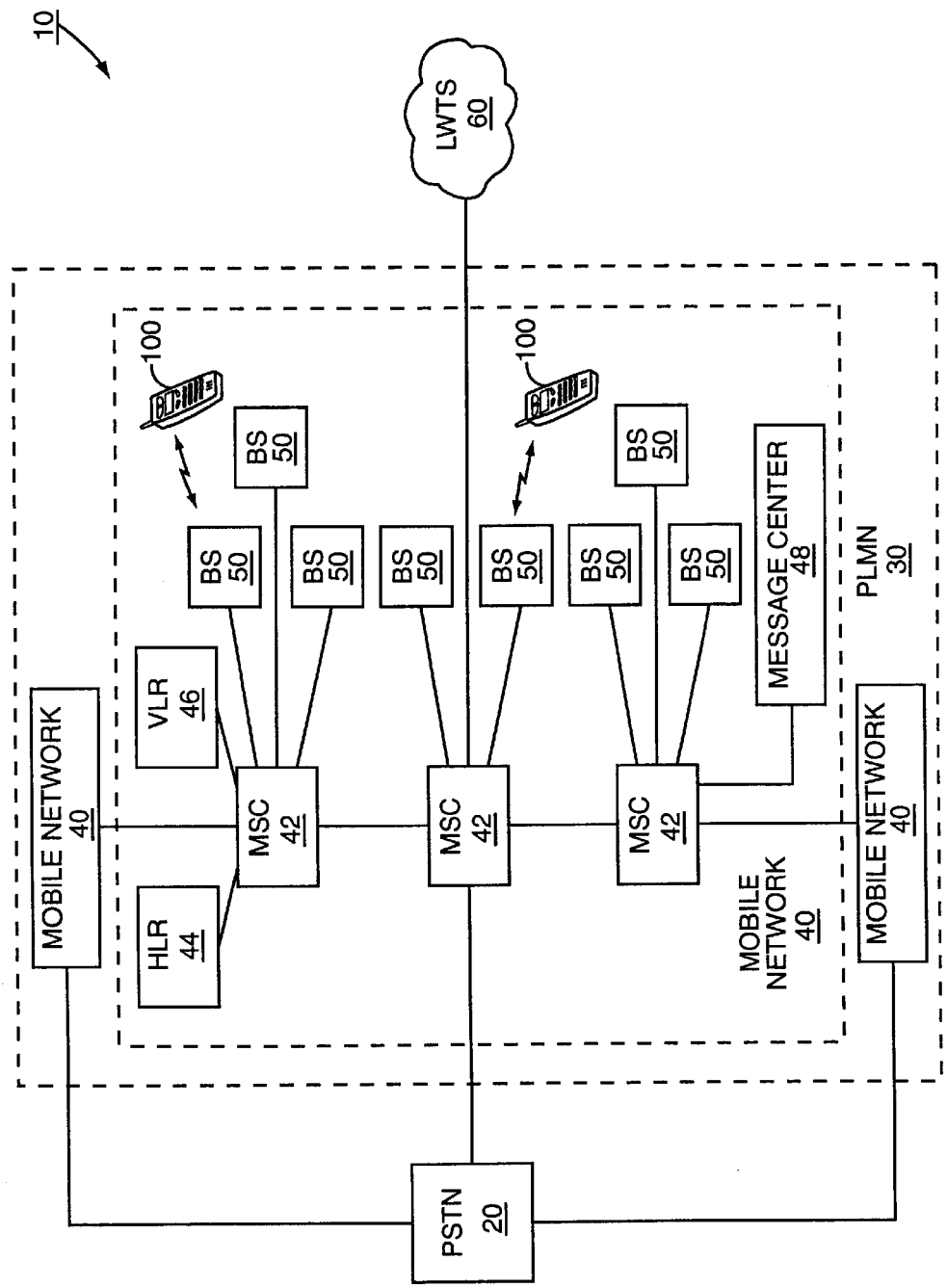
FIG. 1 illustrates a mobile communication network.

Turning now to FIG. 1, a communication system 10 is illustrated. In particular, the communications system 10 includes the Public Switched Telephone Network (PSTN) 20 and the Public Land Mobile Network (PLMN) 30, which may, in turn, be connected to one or more Localized Wireless Telephone Systems (LWTS, only one shown) 60. LWTS 60 may be proprietary or public as needed or desired. While not shown, satellites may be used as needed either within the PSTN 20 or the PLMN 30 to provide remote communication links, such as across oceans or the like.

The operation of the PSTN 20 is well established and subject to extensive documentation beyond the scope of the present invention and therefore a more detailed discussion is omitted.

PLMN 30 may include a plurality of proprietary mobile networks 40, such as those operated by AT&T and BELL-SOUTH MOBILITY, also known as service providers. Each mobile network 40 may include a plurality of Mobile Switching Centers (MSCs) 42. Note that in a TIA/EIA-136 system, MSC stands for Mobile Switching Center. Equivalently, in a GSM system, MSC stands for a Mobile Services Switching Center. The acronym and the functions remain identical, however, the term for which the acronym stands is slightly different. PDC may have yet another name, however, the function of the MSC as herein described is intended to be embraced by the present invention. At least one MSC 42 in the PLMN 30, and more likely one MSC 42 in each mobile network 40 is connected via a gateway to the PSTN 20. Some MSCs 42 may also serve as gateways connecting the various mobile networks 40 within the PLMN 30. Gateway functions may be all consolidated at a single MSC 42 within a mobile network 40 or dispersed amongst a plurality of MSCs 42 within a mobile network 40 as needed or desired. At least one MSC 42 within a particular mobile network 40 may be communicatively connected to a Home Location Register (HLR) 44 and a Visitor Location Register (VLR) 46. Additionally, each mobile network 40 may be equipped with a message center 48 communicatively connected to an MSC 42. Each MSC 42 may further be communicatively connected to a plurality of base stations 50. An MSC 42 responsible for a LWTS 60 may treat the LWTS 60 as another base station 50 or a plurality of base stations 50 depending on the internal structure of the LWTS 60 in question. Each base station 50 may be communicatively connected to one or more mobile terminals 100, typically over an RF communications channel.

The function of the MSCs 42 is to route calls and signals in the mobile network 40 to the appropriate destination. To perform this function, a mobile network 40 relies on the HLR 44 and the VLR 46. HLR 44 is used to store information concerning subscribers to a mobile network 40 e.g. AT&T's subscribers. This information typically includes the subscriber's name and address for billing purposes, the serial number of the subscriber's mobile terminal 100, and the services that the subscriber is entitled to receive. In addition, the current location of the subscriber, as evidenced by the current location of their mobile terminal 100, is stored in the HLR 44.

The current location of the subscriber is secured when the mobile terminal 100 is powered on and at periodic intervals thereafter. In particular, the mobile terminal 100 registers through the nearest base station 50 with an MSC 42. This is referred to herein as the "servicing MSC." The servicing MSC 42 then sends information to the HLR 44 indicating in which cell of the mobile network 40 the mobile terminal 100 may be found. This assumes that the subscriber is in his home network—i.e., the one in which he has a service contract.

Mobile terminal 100 also registers through the nearest base station 50, and hence with an MSC 42, when it travels between two different service areas (areas served by different MSCs 42). As part of this registration procedure, the mobile terminal 100 transmits its Mobile Identification Number (MIN) to the closest base station 50, which in turn passes the information to the appropriate MSC 42. MSC 42 uses the MIN to determine which HLR 44 to access. When the mobile terminal 100 registers with the new MSC 42, the new servicing MSC 42 updates the HLR 44 with the current location of the mobile terminal 100. When an MSC 42 receives a call addressed to a subscriber that is not currently in that MSC's service area, the MSC 42 will query the HLR 44 for the subscriber's current location so that the call can be forwarded to the MSC 42 currently servicing the subscriber.

VLR 46 is used to store information about subscribers of mobile terminals 100 that are not in their home network. When subscribers roam outside of their home network, the VLR 46 in the network being visited must keep track of the subscriber's location and be able to verify the Mobile Identification Number (MIN) of the mobile terminal 100. VLR 46 in the network being visited queries the HLR 44 in the subscriber's home service area to authenticate the subscriber and determine the services to which the subscriber is entitled. Information concerning the subscriber is stored in the VLR 46 as long as the subscriber remains registered in the visited network. VLR 46 also stores the current location of the subscriber. The subscriber's current location is communicated back to the home network HLR 44 so that the home mobile network 40 will know where to forward a call addressed to the subscriber who is currently outside the home mobile network 40.

Together, the HLR 44 and the VLR 46 provide the information needed by the MSCs 42 to route calls to the appropriate destination. The routing may further be accomplished by handing the call to another mobile network 40, locating the appropriate base station 50, or passing the call to the PSTN 20 as is appropriate. The exact protocols and communication regimens between the various entities in a mobile network 40 are well documented, such as in TIA/EIA-136, GSM, or PDC, previously incorporated by reference.

Many mobile networks 40 implement a service called short message service (SMS). This service allows subscribers to send and receive short text messages. Messages originating from, or terminating at, a mobile terminal 100 in the network 40 are stored in the message center 48 connected to an MSC 42. Message centers 48 are well understood in the art and a further discussion is omitted.

Mobile terminals 100, while part of the communication system 10 are not central to the present invention and are well understood. It should be appreciated that the term mobile terminal may include a cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

LWTS 60 may be public or proprietary as needed or desired, and is typically a private network installed in a building or on a campus. LWTS 60 allows employees or other persons working in the building or on the campus to use a mobile terminal 100 as an office telephone. LWTS 60 connects with an MSC 42 in the PLMN 30. Thus, subscribers of the LWTS 60 may move seamlessly between the PLMN 30 and the LWTS 60. LWTS 60 may include a control and radio interface (not shown) and a plurality of transceiver stations.

While any base station 50 may include a distributed antenna system, it is expected that base stations 50 within a LWTS 60 are the most likely to have such distributed antenna systems. However, this is not a requirement. Distributed antenna systems may be positioned anywhere within the PLMN 30 or LWTS 60 as needed or desired.

Figure 2:
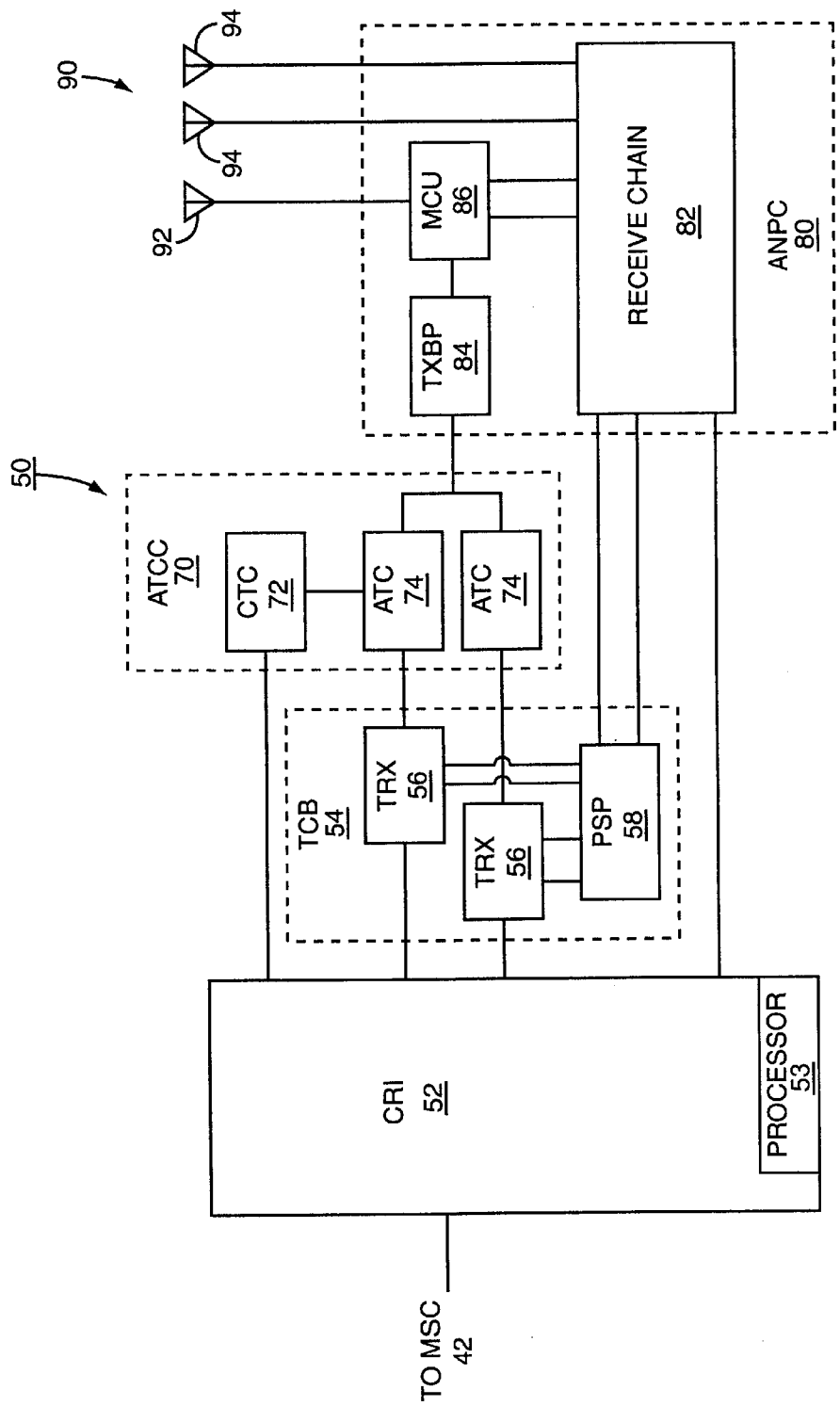
FIG. 2 illustrates a base station suitable for use with the present invention.

An exemplary base station 50 is illustrated in FIG. 2. Each base station 50 may include a Control and Radio Interface (CRI) 52, which in turn is connected to a transceiver cabinet (TCB) 54. Transceiver cabinet 54 may be connected to an Autotuned Combiner Cabinet (ATCC) 70 and an Antenna Near Part Cabinet (ANPC) 80. Antenna Near Part Cabinet 80 may be connected to the Autotuned Combiner Cabinet 70 and to an antenna assembly 90.

CRI 52 may include a processor 53 or the like to control the base station 50 and communicate with the MSCs 42. Alternatively, CRI 52 may be transparent to the MSCs 42, with the control functions lodged in the MSC 42. Transceiver cabinet 54 may typically include eight high power or sixteen low power transceivers (TRX, only two shown) 56 and a power splitter 58 as is conventional. Autotuned Combiner Cabinet 70 may include a Combiner Tuner Controller (CTC) 72 and one or more Autotuned Combiners (ATC) 74. CTC 72 receives information on what frequencies are to be combined within the ATCs 74. Antenna Near Part Cabinet 80 may include a receive chain 82 (equivalently a down link subsystem), a transmit band pass filter 84, and a measurement coupler unit (MCU) 86. Antenna assembly 90 may include a single transmitting antenna 92 and a pair of receiving antennas 94. This structure is embodied in the Ericsson RBS 884 sold by the assignee of the present invention.

Figure 3:
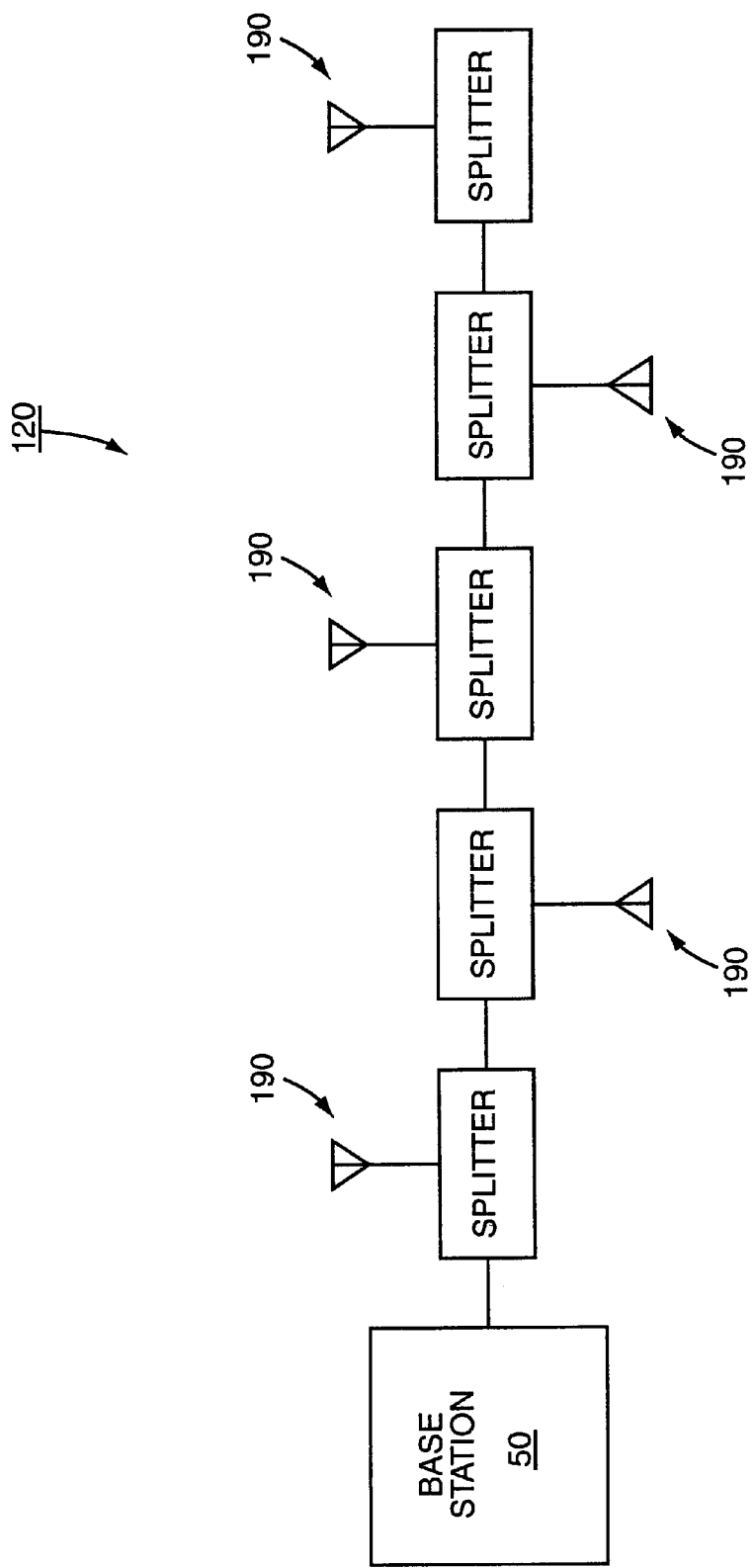
FIG. 3 illustrates a prior art distributed antenna system.

In the past, when such a base station 50 was used with a distributed antenna system 120, antenna assembly 90 was replaced with a plurality of spaced antennas 190 as illustrated in FIG. 3, and each antenna 190 transmitted and received at all the frequency channels available to the base station 50. The entire distributed antenna system 120 acted, in effect, like a single cell. A channel as used herein is defined to be a range of frequencies of sufficient bandwidth to support a communication link.

Figure 4:
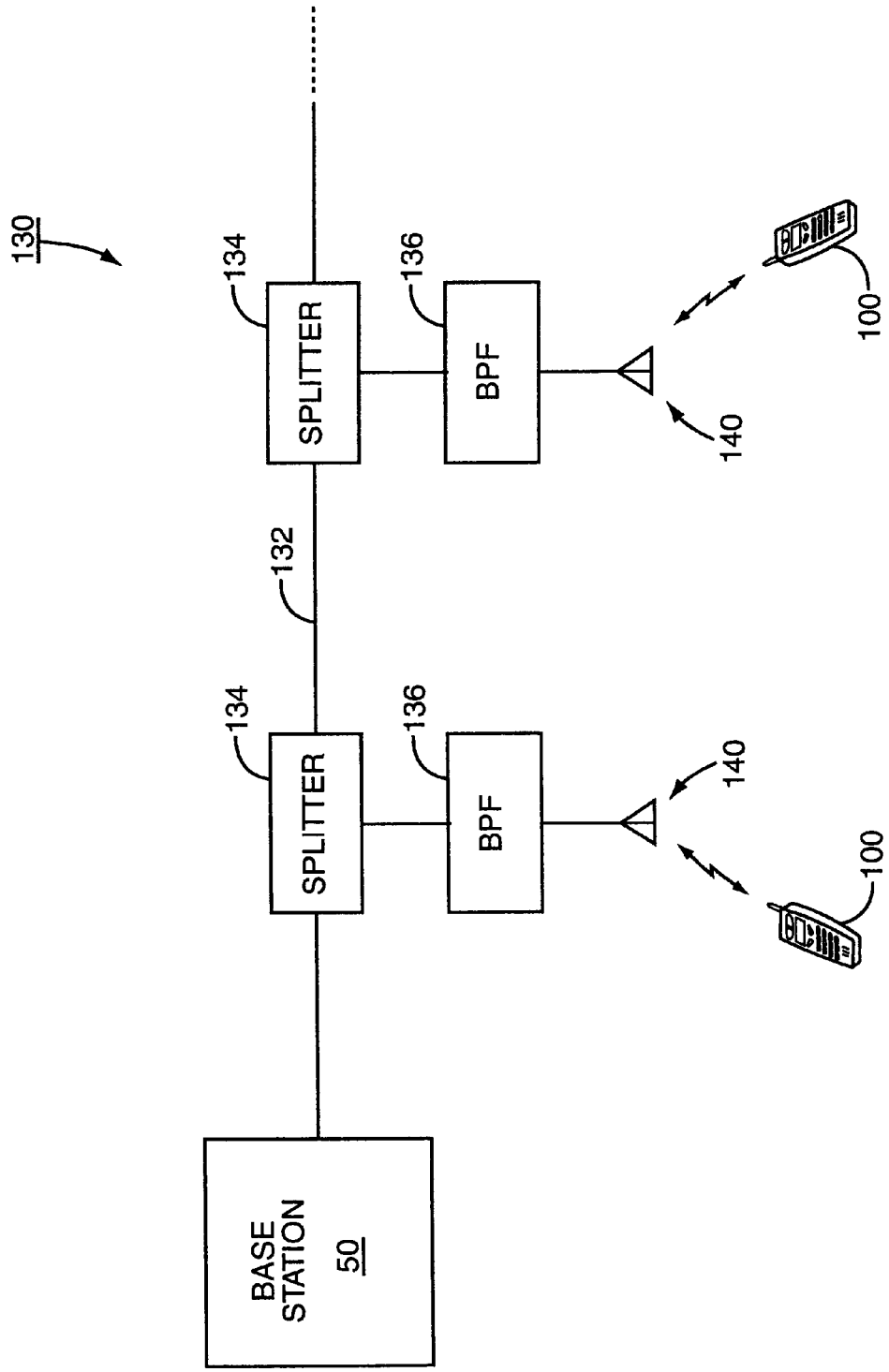
FIG. 4 illustrates a distributed antenna system according to the present invention.

The present invention changes this situation by associating a tunable band pass filter with each transmitting antenna in the distributed antenna system. Further, control information is generated at a processor either in the MSC 42 or in the CRI 52 to control the tunable filters. Turning now to FIG. 4, a distributed antenna system 130 of the present invention is illustrated. Base station 50 communicates over a transmission line 132 to a plurality of transmitting antennas 140. Transmission line 132 may be a coaxial cable, twisted pair, waveguide or other suitable transmission line as is well understood. Periodically along the length of the transmission line 132, a splitter 134 may be positioned, such as a conventional RF splitter. It should be appreciated that the splitter 134 is adapted to be used with the particular transmission line 132 used. A programmable band pass filter 136 is associated with every transmitting antenna 140 within the distributed antenna system 130. While not shown, it should be appreciated that each distributed antenna location may include a receiving antenna. Alternately, the transmitting antenna 140 may double as a receiving antenna with the use of an appropriate duplexer.

Processor 53 (FIG. 2) or an MSC 42 responsible for the base station 50 may generate control information which controls the programmable band pass filters 136 of the present invention. Note that while it is expected that this control information may be generated via software, a hardware solution could likewise be implemented. In particular, the control information so generated instructs the programmable band pass filters 136 as to which channels should be included in one or more pass bands such that those selected channels may be transmitted from the antenna 140 associated with a particular programmable band pass filter 136. Note further that each programmable band pass filter 136 may receive distinct control information such that different programmable band pass filters 136 are allowing different channels to be transmitted. In this manner, the processor 53 or MSC 42 controls which antennas 140 transmit which channels within the distributed antenna system 130. As the programmable band pass filters 136 allow dynamic reassignment of channels, different antennas 140 may transmit different channels depending on the load or demand on the distributed antenna system 130. Thus, in contrast to the prior art, each antenna 140 acts like an individual cell. It is expected that each antenna 140 will transmit a subset of the available channels, although particular "cells" may transmit a subset that includes all available channels.

Control information may be routed to the programmable band pass filters 136 through a number of different techniques. A first embodiment places control information for different programmable band pass filters 136 at different frequencies. These control frequencies may be almost at any frequency from DC to RF. A second embodiment has all the control information located on one frequency, but such control information may be time multiplexed such that particular timeslots control specific programmable band pass filters 136. As a third embodiment, a control frequency may be established and treated like a communications bus, with addressing information. Each programmable band pass filter 136 snoops the control frequency looking for instructions addressed to it. Other control techniques are also possible. The one requirement for the control frequency(ies) is that it not interfere with the RF channels being used to communicate with the mobile terminals 100.

Figure 5:
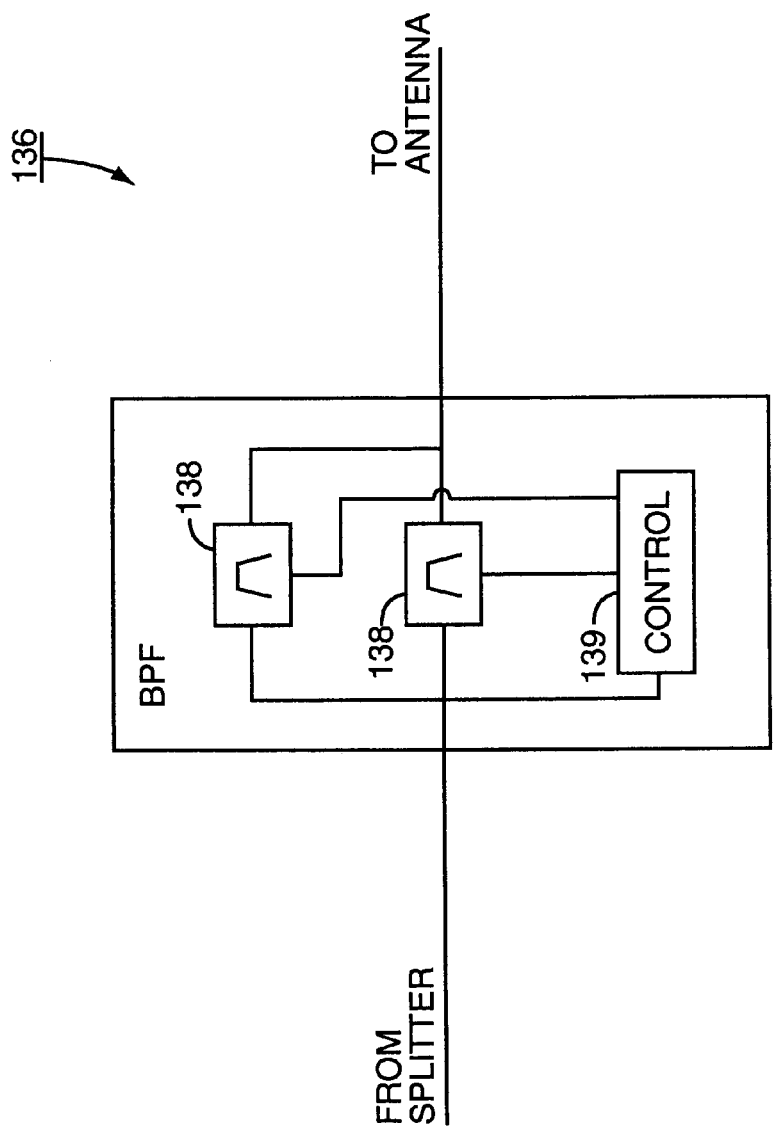
FIG. 5 illustrates a programmable band pass filter used in the present invention.

Control information derived from the processor 53 or the MSC 42 may be sent through the transmission line 132 to each programmable band pass filter 136. Within each band pass filter 136 may be positioned one or more tunable band pass filters 138 and a controller 139, as illustrated in FIG. 5. The tunable band pass filters 138 eliminate all carrier frequencies except for the ones desired to create a cell at the associated antenna location. Controller 139 may receive the control information either by filtering for control information directed to it at a particular, predetermined frequency, at a particular frequency at a particular timeslot, by addressing information, or other technique as previously discussed. Controller 139 in turn interprets the control information and tunes the one or more tunable band pass filters 138 to the desired channels. Note that while two tunable band pass filters 138 are shown, more or less could be provided. Further, while it is expected that each tunable band pass filter 138 would tune to a single channel, it is possible that the tunable band pass filters 138 could in fact be tuned to a range of channels that are proximate one another in the frequency spectrum. While it is expected that this may be an analog filter, it may also be implemented through digital signal processing based digital filtering.

In addition to filtering, the programmable band pass filter 136 may also receive carrier power control information so that the filter 136 is responsible for attenuating each carrier accordingly. As an alternative, a time-slot base station power control signal from the MSC 42 may be used to adjust the power output of the base station 50 so that the filter 136 is not responsible for any power level control. This latter option may reduce the size and cost of the programmable band pass filter 136.

As yet another embodiment, the programmable band pass filter 136 may be used as a splitter. While the programmable band pass filter 136 may include an AC-DC converter that can be connected to an AC outlet at the antenna location, it is also possible that the power may be supplied remotely, such as over the transmission line 132. In this latter case, the programmable filters 136 must separate this low frequency power signal from the intended transmission signal prior to transmitting.

As an example of how this may work, if base station 50 is capable of transmitting on eight channels, $f_1, f_2, \ldots f_8$, then a first antenna 140 may transmit at $f_1$ and $f_4$, while a second antenna transmits at $f_2$ and $f_5$, and third antenna transmits at $f_3$ and $f_6$ to $f_8$. Of course, other arrangements are also possible. Further, these channels may be dynamically reassigned depending on need and demand. Thus, if a first antenna were experiencing a peak in usage, but a third antenna were experiencing a lull, extra channels normally assigned to the third antenna might be reassigned to the first antenna, leaving only one channel for the third antenna.

Figure 6:
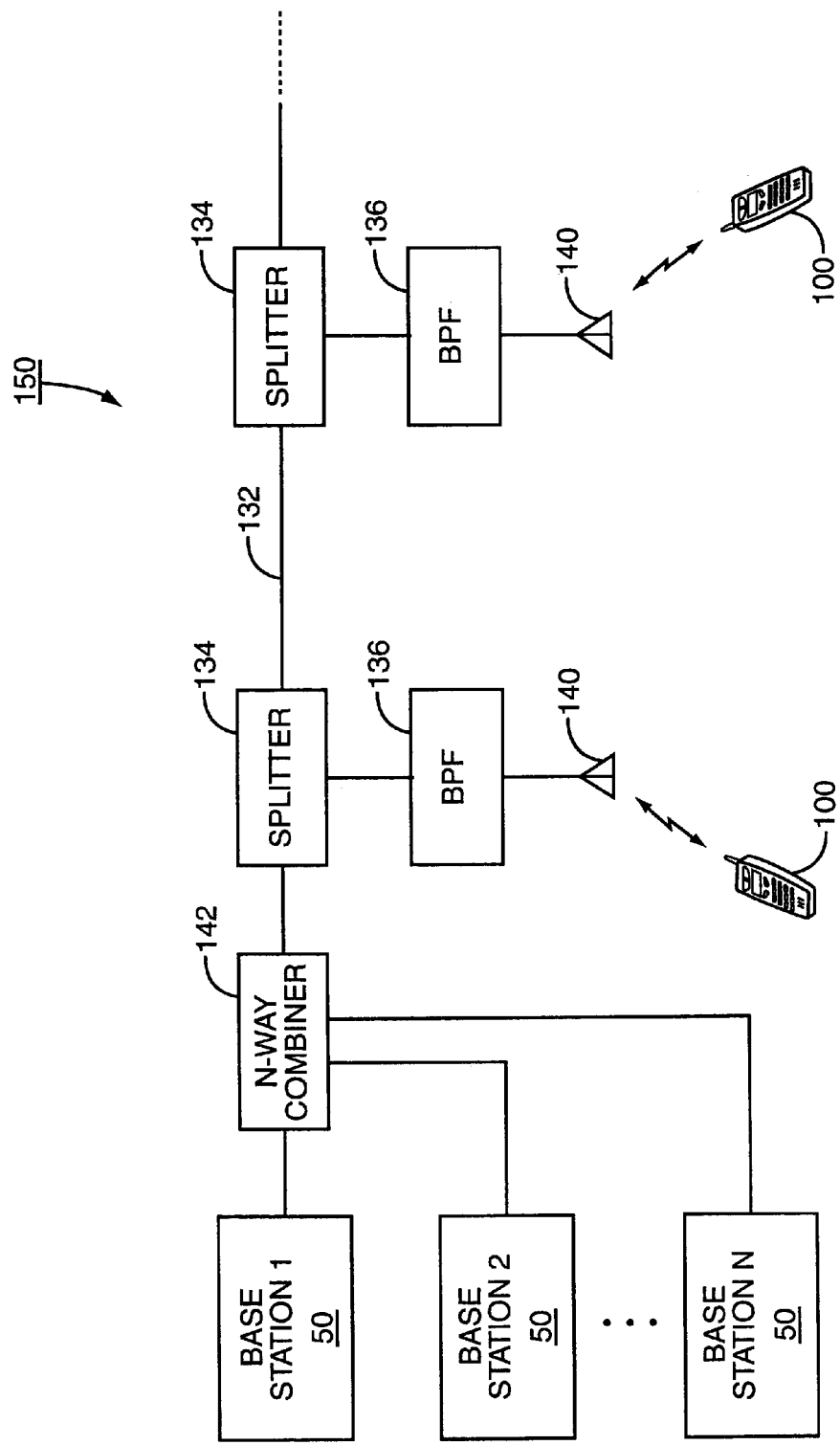
FIG. 6 illustrates an alternate distributed antenna system according to the present invention.

A further benefit is realized in distributed antenna systems including a plurality of base stations 50. An exemplary distributed antenna system 150 having multiple base stations 50 is illustrated in FIG. 6. As illustrated, multiple base stations (base station$_1$ to base station$_N$) 50 are joined by an N-way combiner 142, which in turn is connected to the transmission line 132. Splitters 134 provide spurs of transmission line for each programmable band pass filter 136 and antenna 140 as previously described. Base stations 50 may communicate amongst each other to coordinate which mobile terminals 100 are using which base stations 50 and which antennas 140 are using which channels.

In a first embodiment of a multiple base station 50 distributed antenna system 150, each base station 50 includes mutually exclusive channels about which it then provides control information to the programmable band pass filters 136. This precludes mutual interference between antennas 140. Further, by communicating amongst each other, the base stations 50 may coordinate which cells have which channels. Thus, channels that are close in the frequency spectrum may be used by cells that are relatively geographically remote from each other so as to reduce any likelihood of interference.

A second embodiment (not shown) requires that base stations 50 that use the same channels as one another use a separate transmission line 132 to communicate to the antennas 140. All the antennas may still be shared amongst all the base stations 50. However, through the use of the intercommunication of the base stations 50, a coordinated plan may still be created whereby channels close in frequency are not used by geographically proximate cells. Further, channels may be reused because the information on those channels would be traveling on separate transmission lines. This embodiment has an advantage over the prior art. In particular, cells from different transmission lines may be geographically proximate, and whereas the prior art would have both cells transmitting at all the available channels and potentially causing interference, the present invention allows the base stations 50 to control which channels are transmitted at which cells, allowing such interference to be avoided. Further, this allows channels to be reused at geographically remote cells.

A third embodiment has the multiple base stations 50 sharing transmit channels, but frequency shifting on the transmission lines so as to preclude mutual interference. In this embodiment, the antennas 140 would have to have some mechanism to frequency shift the incoming transmission signals back to the appropriate frequency prior to transmission by the antenna 140. Note that this frequency shifting may also be used by a single base station system, such as that illustrated in FIG. 4.

Figure 7:
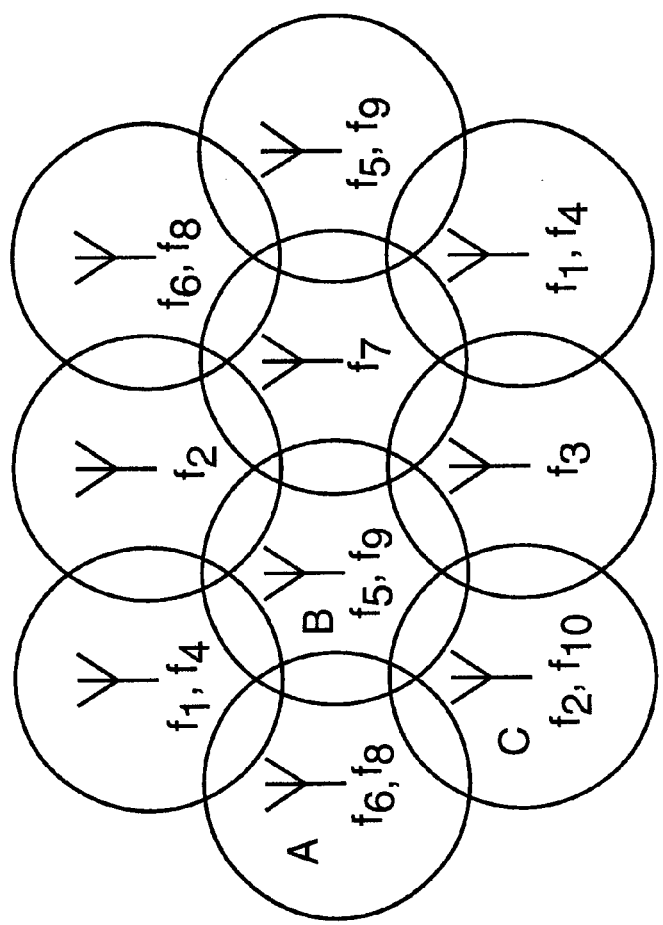
FIG. 7 illustrates an exemplary distributed antenna system exhibiting channel reuse.

Regardless of how accomplished, an example of such channel reuse is illustrated in FIG. 7. Channels are reused in geographically remote cells so that a minimum of interference is the result. Likewise, it should be appreciated that even in this multiple base station system 150, dynamic reallocation of channels depending on need may still be accomplished.

Figure 8:
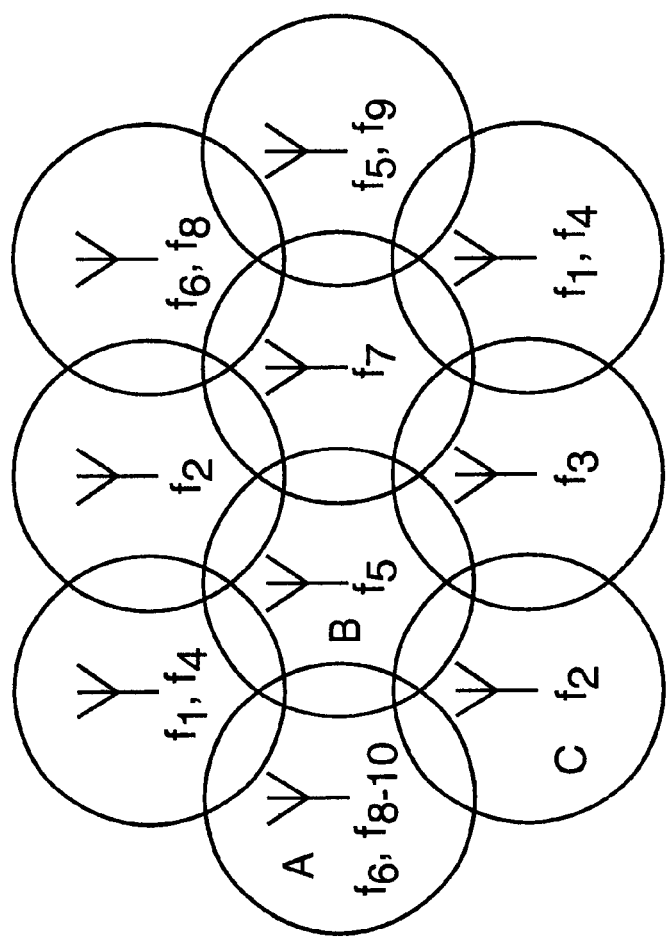
FIG. 8 illustrates the antenna system of FIG. 7 exhibiting dynamic channel allocation.

Dynamic channel allocation is illustrated by comparing FIG. 7 to FIG. 8. In FIG. 8, it can be seen that antenna A now has four channels from two, and antennas B and C have shifted from two channels to one channel apiece. This may have been done because of temporary lulls at antennas B and C and heavy usage at antenna A.

As noted above, the control information may have addressing information, be frequency coded to a particular antenna, be time multiplexed at a particular frequency, or have some other technique used to direct the control information to the appropriate programmable band pass filter 136.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A distributed antenna system comprising:
    at least one base station;
    a transmission line communicatively connected to said at least one base station to carry RF signals from said base station to a plurality of antennas; and
    each antenna having a selectively tunable filter associated therewith, wherein said base station sends control information over said transmission line to said antennas to tune said filters.

2. The distributed antenna system of claim 1 wherein said transmission line comprises coaxial cable.

3. The distributed antenna system of claim 1 wherein said at least one base station comprises a plurality of base stations.

4. The distributed antenna system of claim 3 further comprising a plurality of transmission lines, each of said transmission lines operatively connected to a different one of said plurality of base stations.

5. The distributed antenna system of claim 1 wherein each of said plurality of antennas transmits at a different channel.

6. The distributed antenna system of claim 1 wherein channels are reused between different ones of said plurality of antennas.

7. The distributed antenna system of claim 1 wherein said base stations dynamically reallocate channels by tuning said filters in response to changes in demand between different antennas.

8. The distributed antenna system of claim 1 wherein said base station comprises a controller that generates said control information.

9. The distributed antenna system of claim 1 wherein said base station receives said control information from a remote source and passes said control information to said antennas.

10. A communication system comprising:
    an MSC;
    one or more base stations operatively connected to said MSC, one of said one or more base stations comprising a distributed antenna system and a controller, said distributed antenna system comprising:
    a transmission line communicatively connected to said controller to carry RF signals from said one or more base station to a plurality of antennas; and
    each antenna having a selectively tunable filter associated therewith wherein said controller sends control information over said transmission line to said antennas to tune said filters.

11. The communication system of claim 10 wherein said transmission line comprises a coaxial cable.

12. The communication system of claim 10 wherein said distributed antenna system is associated with a LWTS.

13. The communication system of claim 10 wherein said distributed antenna system comprises a plurality of cells.

14. The communication system of claim 13 wherein channels may be dynamically reassigned between said plurality of cells by tuning said filters in response to demand.

15. The communication system of claim 10 further comprising a mobile terminal communicatively connected to one of said antennas.

16. A method of using a distributed antenna system, comprising:

generating control information;

selectively tuning a plurality of band pass filters to selected channels by sending said control information to said plurality of band pass filters over a transmission line, said transmission line operable to carry RF signals from a base station to an antenna associated with each said band pass filter; and transmitting the selected channels from said antennas associated with each of said plurality of band pass filters.

17. The method of claim 16 wherein selectively tuning a plurality of band pass filters to selected channels comprises selectively tuning each of said plurality of band pass filters to different ones of said selected channels.

18. The method of claim 16 wherein transmitting the selected channels from antennas comprises transmitting an RF signal from said antennas.

19. The method of claim 16 wherein generating control information comprises generating control information at a processor within a base station.

20. The method of claim 16 further comprising sending said control information to each of said plurality of band pass filters.

21. A method of using a communication system comprising:

generating control information at a base station processor;

sending said control information to programmable band pass filters over a transmission line, said transmission line operable to carry RF signals from said base station to different antennas in a distributed antenna system;

using said control information to tune said programmable band pass filters at said different antennas in said distributed antenna system; and transmitting through said antennas at said selected channels to one or more mobile terminals.

22. The method of claim 21 further comprising forming a plurality of cells with different ones of said antennas.

23. The method of claim 21 further comprising reusing channels in response to increased demand on the distributed antenna system.

24. The method of claim 21 further comprising connecting a base station associated with said base station processor to each of said different antennas with a transmission line.

25. The method of claim 24 wherein connecting a base station to each of said different antennas with a transmission line comprises connecting a plurality of base stations to a plurality of different antennas with a plurality of transmission lines.

26. A distributed antenna, comprising:

a plurality of antennas, including at least a first antenna and a second antenna, communicating with a controller via a transmission line, said transmission line carrying RF signals from said controller to said first antenna and said second antenna;

a first programmable band pass filter associated with said first antenna, said first programmable band pass filter selectively limiting the channels supplied via said transmission line that are transmitted by said first antenna;

a second programmable band pass filter associated with said second antenna, said second variable band pass filter selectively limiting the channels supplied via said transmission line that are transmitted by said second antenna; and said first and second programmable band pass filters responsive to control signals from said controller to change independently the channels transmitted by said first and second antennas.

27. The distributed antenna of claim 26 wherein:

during a first time interval, said first antenna transmits at least a first channel and said second antenna transmits at least a second channel but not said first channel; and during a second time interval, said second antenna transmits at least said first channel in response to changes in said second programmable band pass filter.

28. The distributed antenna of claim 26 wherein:

during a first time interval, said first programmable band pass filter allows said first antenna to transmit a first channel; and during a second time interval, said first programmable band pass filter precludes said first antenna from transmitting said first channel.

* * * * *